United States Patent

[11] 3,616,068

| [72] | Inventors | John P. Glass<br>c/o Cava Industries, 79 La Grange Ave., Essington, Pa. 19029;<br>Anton K. Simson, San Diego, Calif. |
|---|---|---|
| [21] | Appl. No. | 758,241 |
| [22] | Filed | Sept. 9, 1968 |
| [45] | Patented | Oct. 26, 1971 |
| [73] | Assignee | said Glass, by said Simson |

[54] APPARATUS FOR MAKING A BUILDING ELEMENT
9 Claims, 14 Drawing Figs.

| [52] | U.S. Cl. | 156/441, 156/436, 156/443, 156/446 |
|---|---|---|
| [51] | Int. Cl. | B29d 7/00 |
| [50] | Field of Search | 156/179, 205, 172, 446, 441; 117/119 |

[56] References Cited
UNITED STATES PATENTS

| 2,568,349 | 9/1951 | McKee | 156/205 X |
|---|---|---|---|
| 2,848,354 | 8/1958 | Daley | 117/119 X |
| 2,862,541 | 12/1958 | Brink | 156/172 |
| 3,082,292 | 3/1963 | Gore | 156/179 X |
| 3,300,355 | 1/1967 | Adams | 156/446 X |
| 3,361,616 | 1/1968 | Scharf | 156/179 X |
| 3,481,802 | 12/1969 | Marcell | 156/179 X |

*Primary Examiner*—Benjamin A. Borchelt
*Assistant Examiner*—G. E. Montone
*Attorney*—John F. A. Earley

ABSTRACT: A building element useful in constructing plastic boat hulls and methods of making the element. The building element includes a plurality of glass fibers in the form of roving which are substantially parallel to each other, a resin binding the glass fibers together, and a plastic sheet covering one or both sides.

The building element may be continuously made by passing a plurality of strands of glass fiber roving through a perforated guide plate into a trough of resin formed by the bight of a pair of rollers, feeding a plastic sheet over each roller into said bight to protect the rollers from the resin and to form a sandwich structure with the resin impregnated strands of roving being enclosed within the plastic sheets, and cutting across the plastic sheets and resin impregnated glass strands at a desired angle to form a stamp element.

The building element may also be made by passing glass fiber roving through a resin pot and winding the roving around a drum which is covered by a polyethylene sheet. When the roving has reached the desired thickness, the building element is formed by cutting across the sheet and fibers and removing it from the drum.

PATENTED OCT 26 1971

3,616,068

INVENTORS
JOHN P. GLASS &
ANTON K. SIMSON

BY John F. A. Earley

ATTORNEY

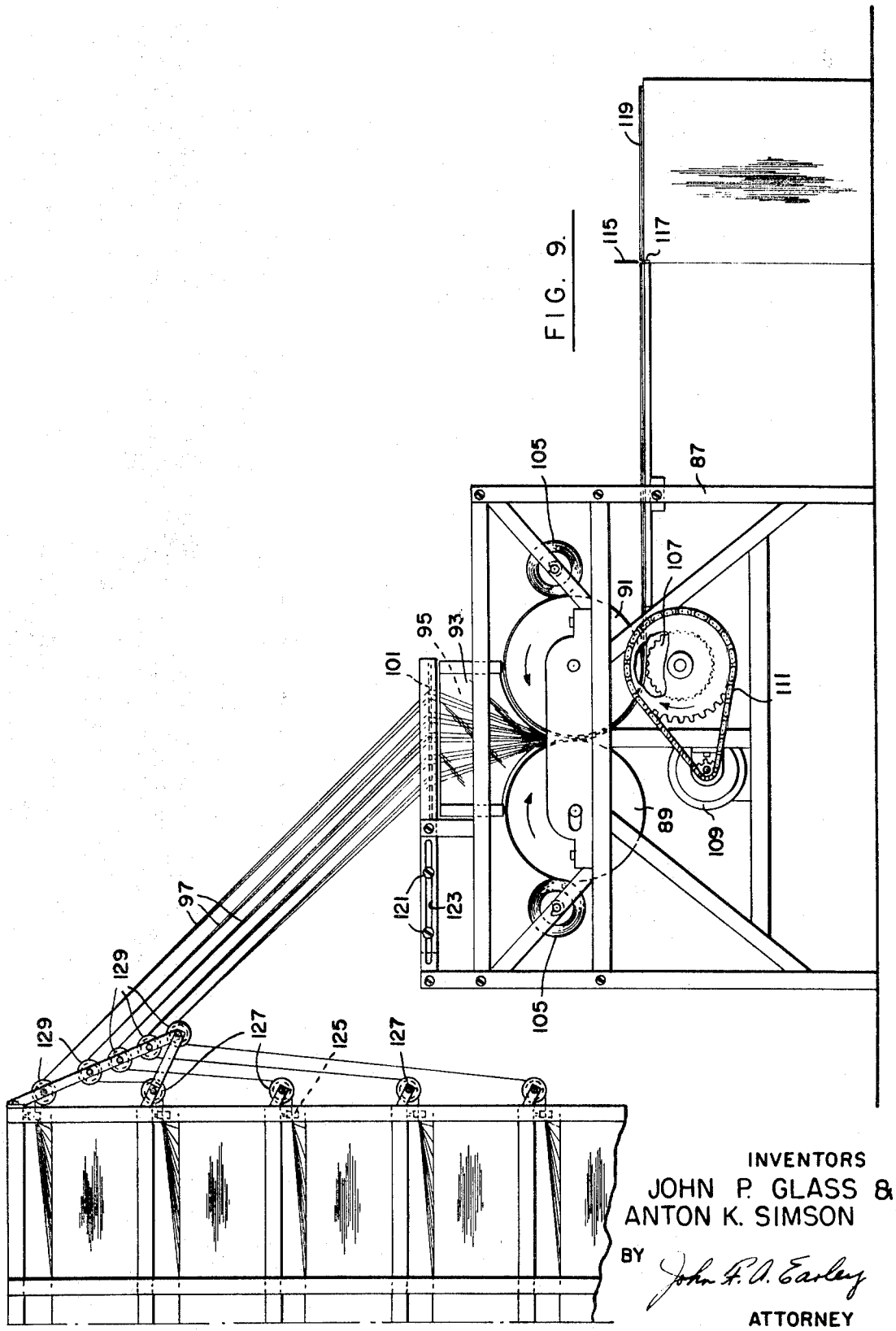

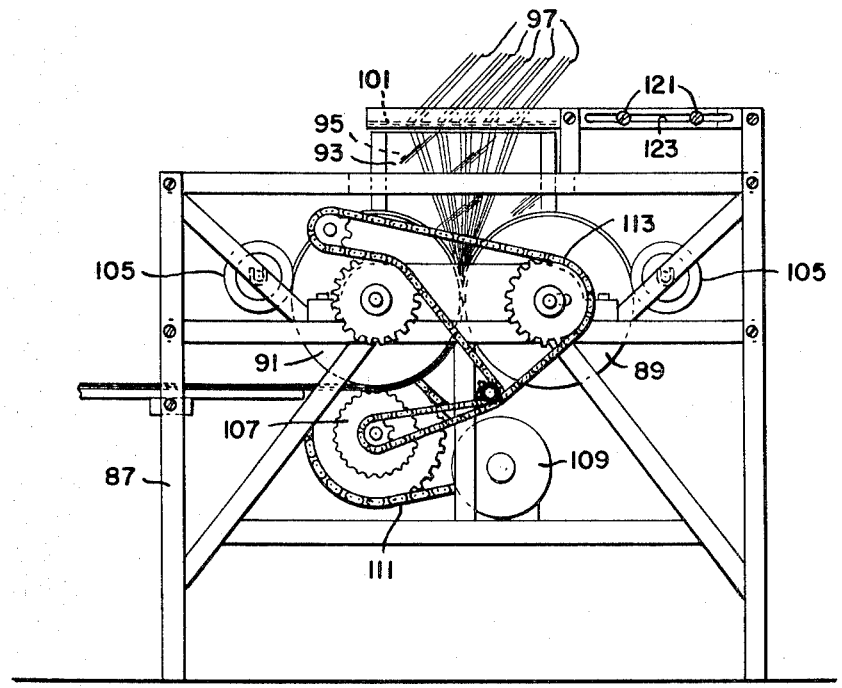
FIG. 12.
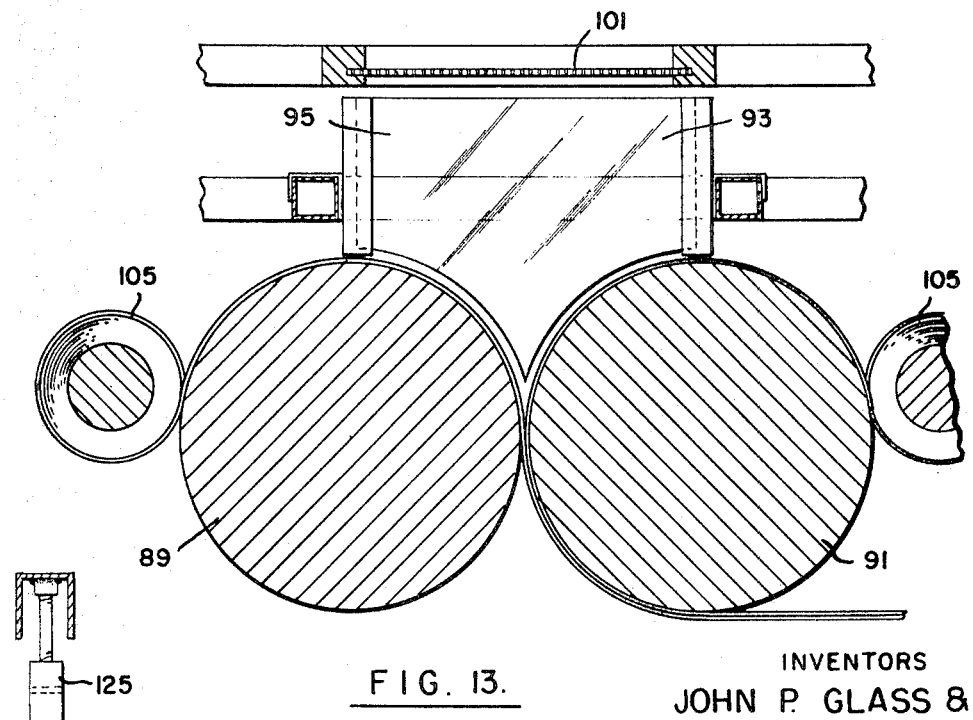
FIG. 13.
FIG. 14.
INVENTORS
JOHN P. GLASS &
ANTON K. SIMSON
BY
*John F. A. Earley*
ATTORNEY

APPARATUS FOR MAKING A BUILDING ELEMENT

BACKGROUND OF THE INVENTION

This invention relates to building elements useful in constructing boat hulls, for example, and is concerned with methods and apparatus for making the building element and for using it to construct various objects.

Boat hulls have been made of glass fibers impregnated with resin to hold the fibers together, but such hulls have required a high proportion of resin and are heavier and weaker than if it were possible to use a higher percentage of fibers. Glass fibers are much stronger and lighter than resin. Also, previous glass fiber hulls have been constructed of glass fiber mats which are more expensive than glass fiber roving.

Another problem in producing glass fiber building elements has been caused by the fast drying of the adhesive resin which dried very rapidly in about 15 to 30 minutes so that the stamp elements had to be make in batch fashion so as to use a batch of adhesive resin before it dried up.

Glass fiber building elements made from woven glass fiber roving or mats trap air when being impregnated with resin and this air is very difficult to remove by rolling in the lay-up process, and if the air is not removed the building element is pourous and weak.

Moreover, conventional glass fiber elements are strong in the direction of the fiber strands but are weak in the transverse direction. See Analysis of Composite Structures, Tsai et al., NASA Contractor Report, NASA CR–620, Nov. 1966.

SUMMARY OF THE INVENTION

The invention comprises a glass fiber building element which is stronger and is more easily handled in constructing an object such as a boat hull. The building element comprises a plurality of glass fiber strands which are in alignment and which are held together by a binding resin. A plastic sheet covers one or both sides and makes it easier to handle the building element. The plastic sheet also protects the manufacturing apparatus from the resin which may be quite sticky and messy.

A strong composite building element is formed by crossing alternate layers of glass roving within the element itself, or by placing successive building elements so that their fibers make angles with each other to give strength in many directions.

The building element uses glass fiber roving instead of the more expensive glass fiber mats or cloth, and is stronger and lighter in weight because it uses a higher percentage of glass fibers to resin. Cracking of the elements is minimized by cutting the edges of the building elements in a zigzag fashion. The building elements are more easily applied to a mold. Roving is also preferred because it prevents shrinkage of the resin whereas mat and cloth allow the resin to shrink.

BRIEF DESCRIPTION OF THE DRAWINGS

Other objects and advantages of this invention, including its simplicity and economy, as well as the ease with which it may be adapted to existing equipment, will further become apparent hereinafter and in the drawings, in which:

FIG. 9 is a view in side elevation of another embodiment of apparatus for making a building element;

FIG. 12 is a view in side elevation of the far side of the apparatus of FIG. 9;

FIG. 13 is a view in section taken as indicated by the lines and arrows 14—14 which appear in FIG. 10.

DESCRIPTION OF THE PREFERRED EMBODIMENTS

Figure 1:
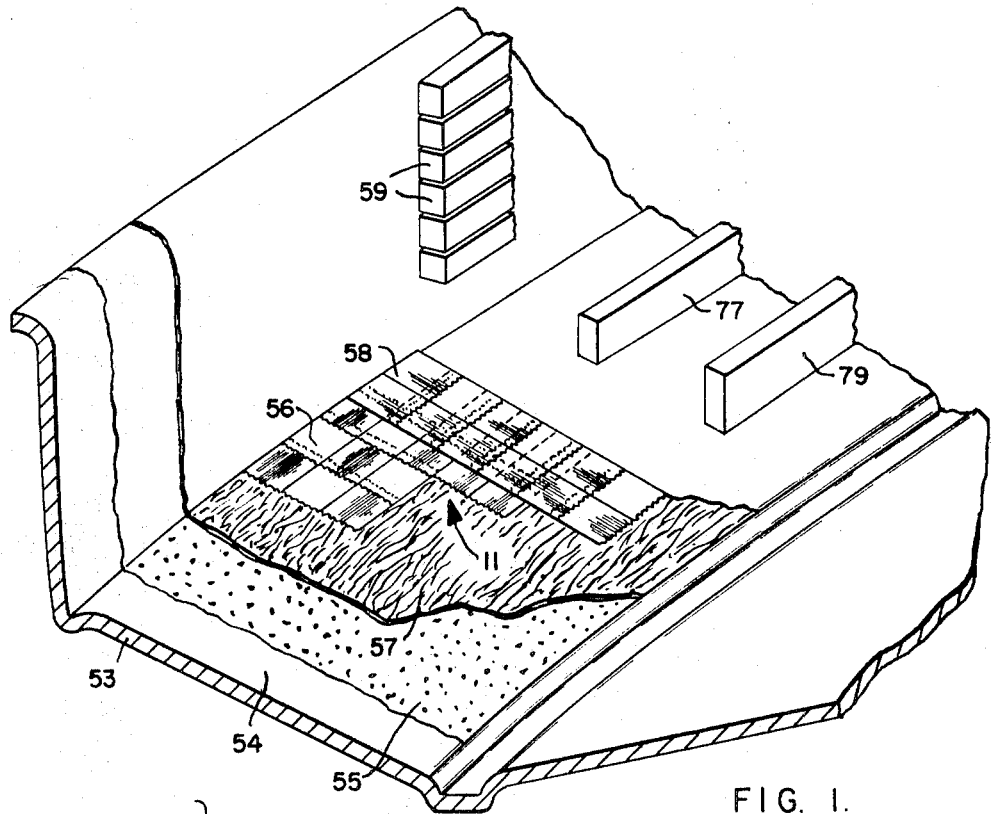
FIG. 1 is a view in perspective, with parts broken away, of a boat hull being constructed in accordance with this invention.

Although specific terms are used in the following description for clarity, these terms are intended to refer only to the structure shown in the drawings and are not intended to define or limit the scope of the invention.

Figure 3:
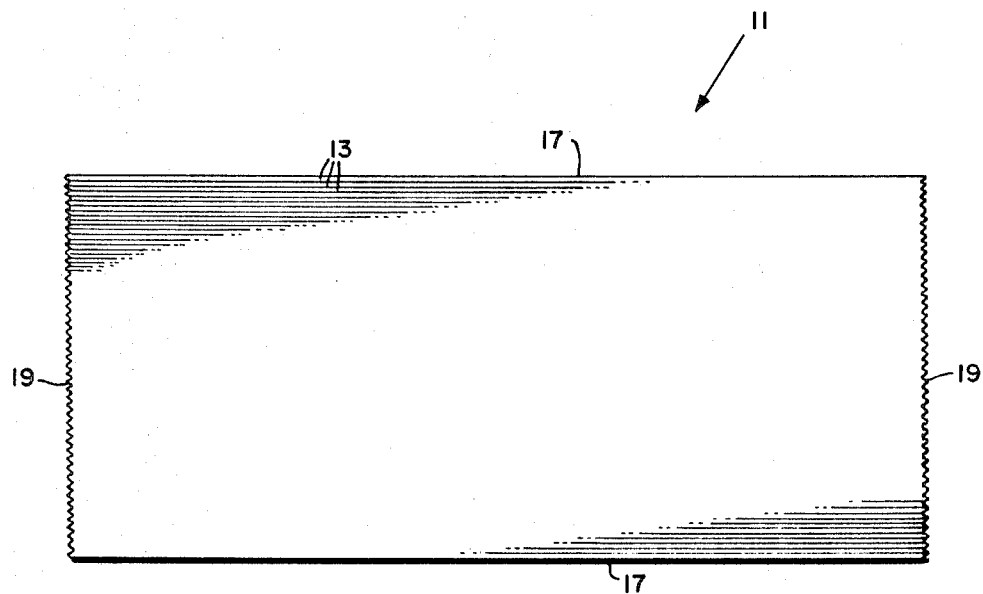
FIG. 3 is a top plan view of a building element.
Figure 4:
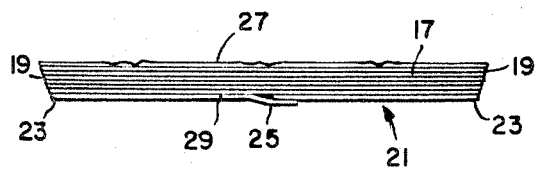
FIG. 4 is a view in elevation of the building element looking from the bottom of FIG. 3, but on a smaller scale.
Figure 5:
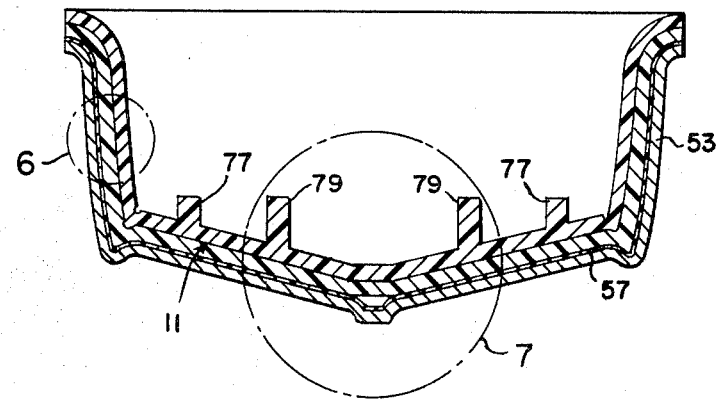
FIG. 5 is a view in cross section of a boat hull in a boat hull mold.
Figure 7:
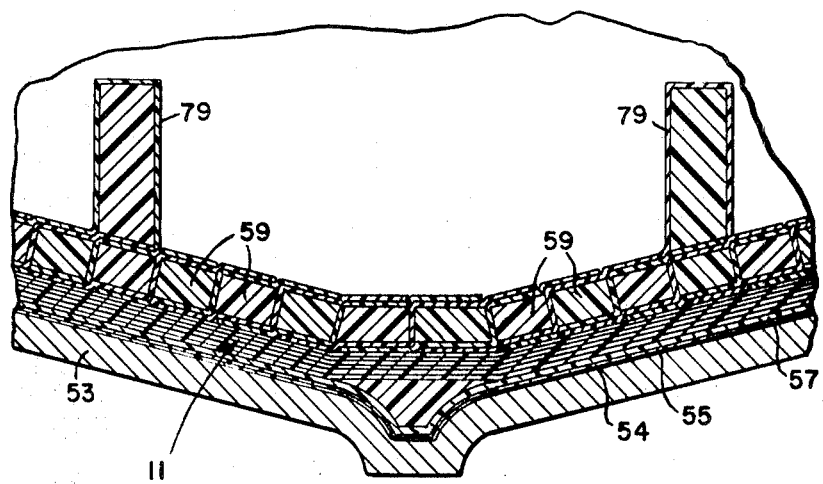
FIG. 7 is an enlarged view of another portion of FIG. 5 as indicated by the numeral 7.
Figure 10:
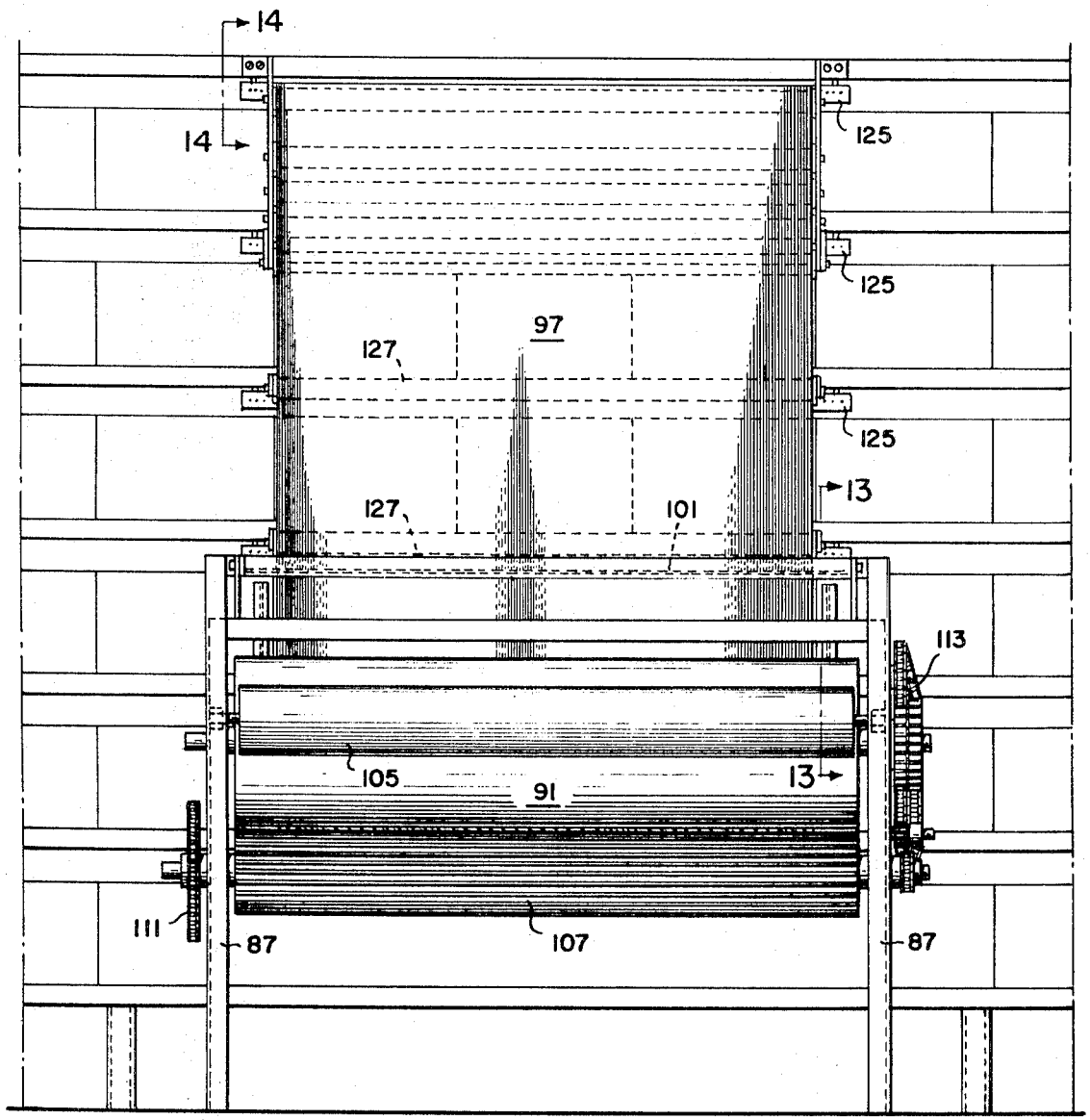
FIG. 10 is a view in front elevation of the apparatus of FIG. 9.
Figure 11:
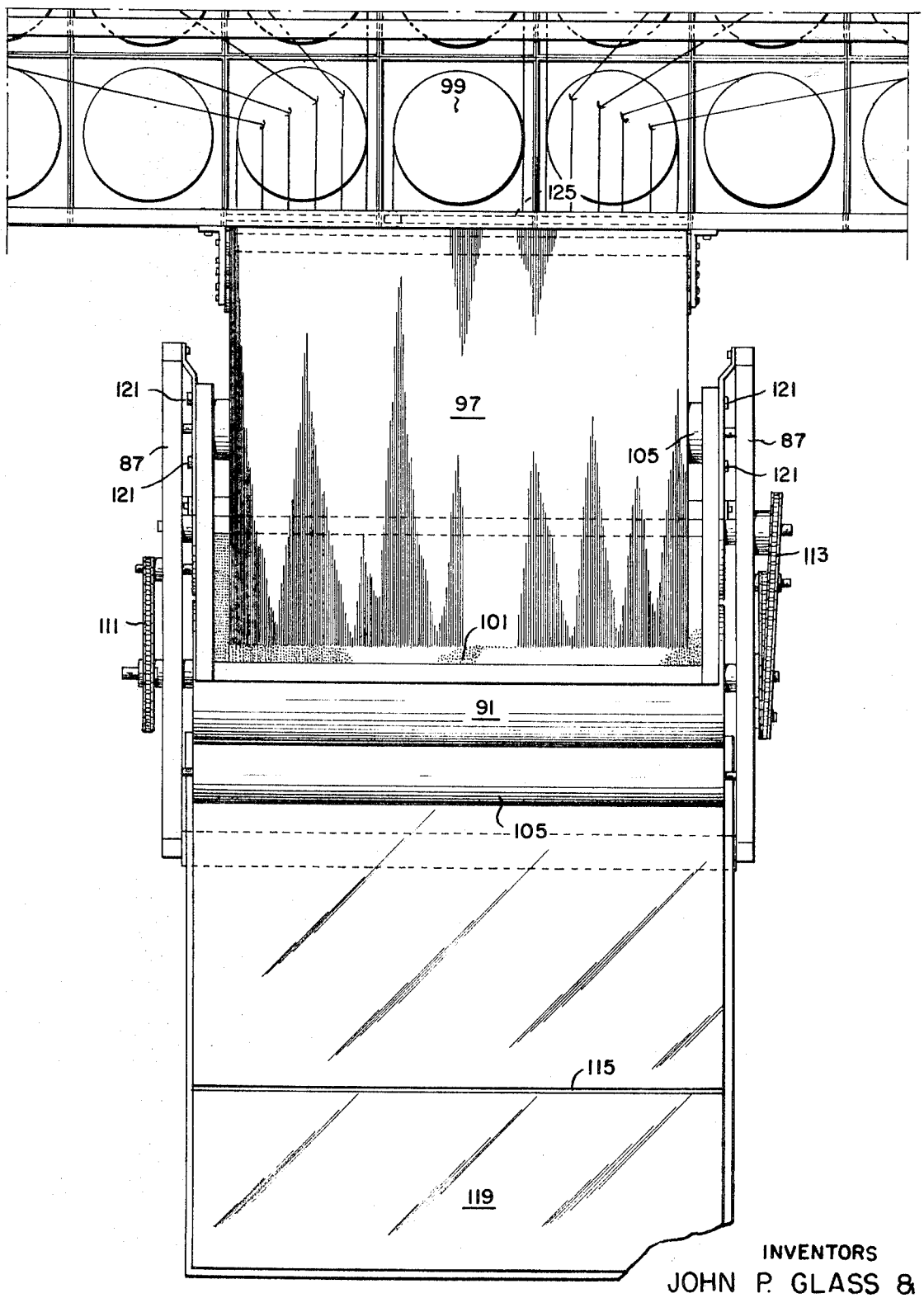
FIG. 11 is a view in top plan of the apparatus of FIG. 9.

Turning now to the specific embodiments of the invention selected for illustration in the drawings, there is shown in FIGS. 3, 4, a boat hull building element 11 which is sometimes referred to herein as "stamp" element 11 because of its resemblance in some respects to the outline of a postage stamp. Stamp element 11 comprises a plurality of parallel glass fibers 13 which are wound like a roll of cord with the strands of alternate layers at angles to each other or substantially parallel to each other, and a binder of resin 15 that holds fibers 13 together. Stamp element 11 includes side edges 17 running parallel to glass fibers 13, and ends 19 that are cut off in zigzag fashion, as by pinking shears. The zigzag cut reduces stress concentrations at ends 19 so as to inhibit cracking or unraveling.

Beneath resin impregnated fibers 13 is a polyethylene sheet 21 having free ends 23 and overlapping ends 25. Top surface 27 of glass fibers 13 is longer than bottom surface 29, and some buckling may occur in top surface 27 when the stamp element 11 is placed with its bottom surface 29 against a flat surface. This slight buckling of top surface 27, and the longer length of the top surface fibers as compared to the bottom surface fibers, result from one of the methods and apparatus for making the stamp element.

Figure 2:
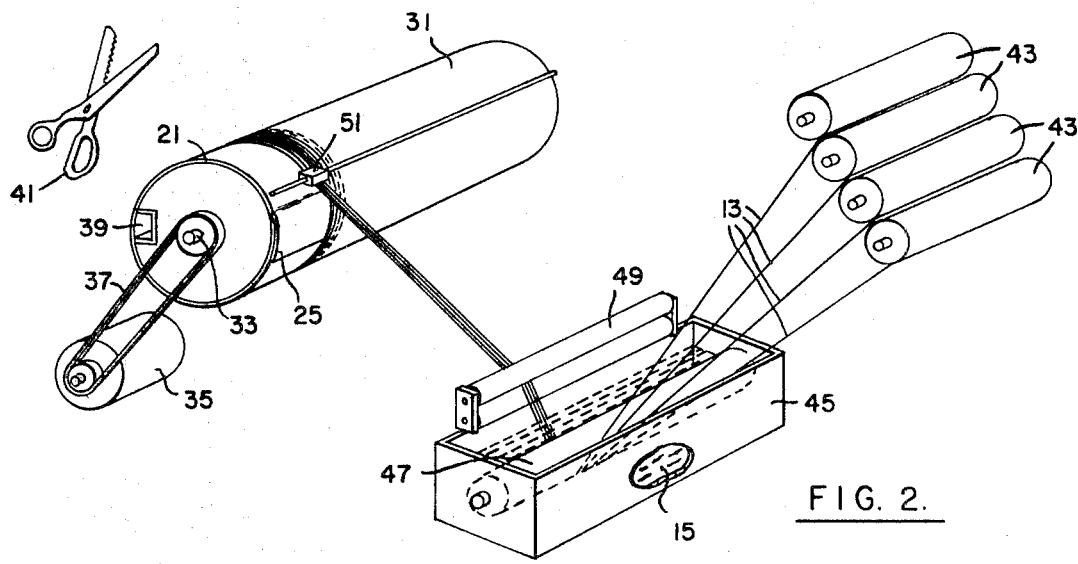
FIG. 2 is a diagrammatic view of apparatus for making a building element for the boat hull.

Referring to FIG. 2, there is shown apparatus for making stamp elements 11, including a rotatable drum 31 having a shaft 33 that is rotatably supported and driven by a motor 35 and bolt 37. Drum 31 may be any size, and one of the preferred sizes is 30 inches in width and 72 inches in circumference so as to produce a 30 by 72 inch stamp element. A slot 39 is formed across the width of drum 31 and is adapted to receive a cutting tool 41.

A plurality of spools 43 of glass fiber roving is provided, and the roving is passed through a liquid resin in a pot 45 and trained under a roller 47 that is partly submerged in the resin. During passage through resin pot 45, the roving is impregnated with the resin 15 and is passed outwardly through a squeegee 49 and to a level-winding device 51 which lays a flat band of the roving evenly along drum 31 as the drum rotates.

In the operation of the apparatus of FIG. 2, a polyethylene sheet 21 is clipped onto the drum to cover its cylindrical surface completely with ends 25 being overlapped and positioned approximately 180° away from slot 39. The strands of roving are wound onto sheet 21 by level-winding device 51 so that the roving rides evenly along the drum in a flat band that progresses from one end of the drum to the other end and then reverses. The strands of roving are wound on the drum as straight as possible for greater strength, and the roving is wound to a suitable depth, approximately one thirty-second to one-tenth of an inch, for example. The thickness of the roving on the drum depends on the diameter of the drum and the amount of permissible buckling of the stamp elements outer surface after the stamp element is removed from the drum and placed onto a flat surface.

When the roving reaches the desired depth, the drum is stopped, and tool 41 cuts sheet 21 and the glass fibers along slot 39, in the manner of pinking shears, to give zigzag edges to the ends 19 of stamp element 11.

Stamp element 11 is easily lifted from drum 31 because sheet 21 lines the resin impregnated glass fibers 13 and prevents them from sticking to the drum. Accordingly, stamp element 11 may be handled like wallpaper.

To build a boat hull, stamp element 11 is flopped into a boat hull mold 53 with plastic sheet 21 up. Rollers are pressed against the outer surface of dry plastic sheet 21 to press air out of the resin impregnated glass fibers 13 and to press the fibers into good contact with a preceding layer in the mold. Then plastic sheet 21 is removed by grasping overlapping ends 25 and peeling the sheet away.

A series of stamp elements 11 are placed in mold 53 so that the cut ends 19 overlap each other, and the side edges 17 of adjacent tiers abut.

Another layer of stamp elements 11 may be placed on the first layer in the same manner, but with the fibers 13 of the second series running at an angle to the fibers of the first series. Stamp elements 11 are stronger in the direction parallel to glass fibers 13, and by running successive layers of stamp elements 11 on a bias, the units become stronger in other directions.

The methods of making a boat hull in boat hull mold 53 includes the steps of applying a layer 54 of wax release compound to mold 53 to prevent sticking, and applying a gel coat 55 to layer 54. A series of fibrous glass reinforcing mats 57 are placed on gel coat 55, and a first layer 56 of stamp elements 11 is placed on the mats 57. The stamp elements of first layer 56 are laid preferably longitudinally of the boat hull with stamp element ends 19 overlapping and stamp element side edges 17 abutting. A second layer 58 of stamp elements 11 is placed on first layer 56 so that the fibers form an angle with the fibers of the first layer. Additional stamp element layers are laid as required to build up to the desired thickness.

The mats 57 prevent the laps and the weave of the stamp elements 11 from showing through the gel coat 55 to the outside of the boat hull.

In order further to build up the thickness of the boat hull, blocks 59 may be used and may be made of any material that is light in weight compared to its volume. For example, blocks 59 may be made of foamed polyethylene, which is preferred, or may be even made of hollow cardboard boxes.

Figure 6:
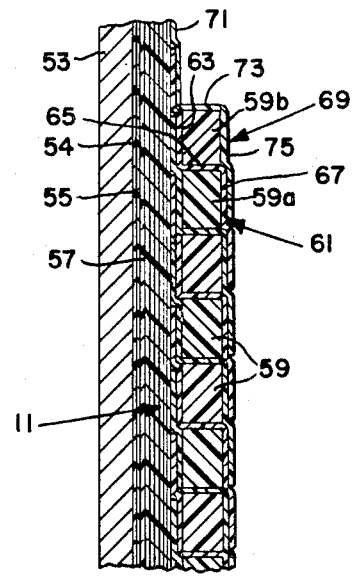
FIG. 6 is an enlarged view of a portion of FIG. 5 as indicated by the numeral 6.

In the method, FIG. 6, a first block 59a is placed in mold 53, and a first tape 61 is applied so that a first end portion 63 of the tape is against stamp elements 11, a middle portion 65 is against a sidewall of first block 59a, and a second end portion 67 of the tape overlies the top of first block 59a.

A second block 59b is placed on first end portion 63, and a second tape 69 is applied so that its first end portion 71 is against stamp elements 11, its middle portion 73 is against a sidewall of second block 59b, and its second end portion 75 overlies the top of second and first blocks 59b and 59a and connects to first tape 61, whereby the second end portions of the tapes form an inner shell of the boat hull.

The boat hull is provided with stringers 77 and 79 which form the engine bed. Stringers 77, 79 may also be made of layers of glass fibers over blocks of foamed polyethylene and the like.

As an alternative embodiment of the method of making the stamp elements 11, instead of passing the glass fibers through the pot 45 to impregnate them with resin, the resin may be sprayed onto the glass fiber roving using a dual airless spray gun which feeds two constituents of the resin and mixes them in the gun spray.

Also, instead of applying a second layer of stamp elements 11 to a first layer within the boat hull mold 53, a second drum may be used to build a stamp element which is detached and then applied to the stamp element of drum 31 while it is still on the drum. The fibers of the two stamp elements run at an angle to each other so that a strong two-ply stamp element is formed.

It is preferable to make a crisscross stamp element on the drum by winding alternate layers of the roving at angles to each other. The crisscrossed strands have the strength of woven roving without the necessity of actually weaving the strands. The cross-stamp element does not spread apart when being laid in the mold, unlike the unidirectional stamp element with parallel strands that tend to separate.

Any suitable resin may be used as the binder for the glass fibers, such as an epoxy or a polyester.

Figure 8:
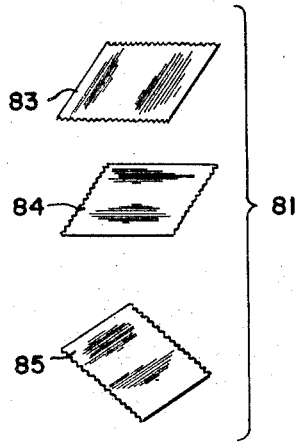
FIG. 8 is an exploded view of another embodiment of building element constructed in accordance with this invention.

FIG. 8 shows an exploded view of a stamp element 81 having three layers 83 to 85 with the fiber strands of layer 84 running at an angle of 90° from the fiber strands of layer 83, and the fiber strands of layer 85 running at an angle of 45° from the strands in layers 83 and 84. The resulting composite stamp element 81 is a three-ply element that is strong in three directions. Each layer is strong in the direction of alignment of the fiber strands but is weak in the transverse direction since the transverse strength is only the strength of the resin binding the strands together. Combining a number of layers, with the fiber strands of each layer running at angles to each other, provides greater strength in a number of directions.

FIGS. 9 to 14 show the presently preferred embodiment of apparatus for making a stamp element including a frame 87 on which is mounted a pair of trough rollers 89 and 91 which, together with a pair of end plates 93, define a trough 95 for holding a liquid resin. End plates 93 extend downwardly into the bight of rollers 89 and 91 and keep the resin confined to the trough.

A number of strands 97 of glass fiber roving are fed from bobbins 99 through a perforated grate or guide plate 101 that separates the strands 97 and uniformly spaces them apart. Strands 97 pass from guide plates 101 through the resin in trough 95 and are impregnated with the resin. The impregnated strands 97 are covered on each side by a plastic sheet to form a sandwich structure that may be handled without touching the sticky and messy impregnated fiber strands. Plastic sheets 103 are fed into resin trough 95 from a pair of supply rollers 105 mounted on frame 87 that feed the plastic sheets over rollers 89 and 91. The sandwich structure is fed downwardly through the bight between rollers 89 and 91 and then passes between the bight formed by roller 91 and a corrugated roller 107 mounted on frame 87. Roller 107 is driven by a motor 109 and chain 111, and more than one roller 107 may be used.

Plastic sheets 103 keep rollers 89 and 91 clean by protecting the rollers from the resin, and corrugated roller 107 pulls the sheets 103 and the fiberglass strands through the bight between rollers 89 and 91 and inhibits the glass fiber strands from being forced backwardly in the resin liquid by squeeze rollers 89 and 91. Corrugated roller 107 kneads the sandwich structure and squeezes out some of the air that is trapped in the impregnated fibers to greatly strengthen the fiber element. As may be seen from FIG. 12, corrugated roller 107 drives rollers 89 and 91 by means of a chain 113.

Corrugated roller 107 pushes the sandwich structure to a cutting station which includes a knife 115 and a slot 117. The knife 115 registers with slot 117 and cuts the sandwich structure at a properly adjusted angle into building elements 119 having impregnated strands of glass fibers covered by two sheets of plastic. One sheet of plastic is peeled away, and the building element 119 is handled by holding the other sheet in a manner similar to handling wallpaper. Then element 119 is placed wet-side down in a mold, rolled, and the other plastic sheet is peeled away.

The top sheets may be peeled from adjacent stamp elements 119 and element 119 placed on top of the other to give a composite element having the strands crisscrossing at a desired angle. This composite element has the strength advantages of an element made from a mat or woven roving without the disadvantages of trapping air and greater expense.

Guide plate 101 is adjustably mounted on frame 87 and its position may be changed by moving adjustment bolts 121 in slot 123.

Any leakage through the bottom of trough 81 is impeded by the presence therein of the fiberglass strands 97 passing between rollers 89 and 91. The percentage of resin to fibers is controlled by controlling the clearance between squeeze rollers 89 and 91. The proportion of glass fibers to resin may be 90 percent glass fibers and 10 percent resin, but the resulting stamp element is a little too dry for easy handling because such a small percentage of resin is likely to contain a considerable amount of air. Very satisfactory results have been obtained with a stamp element having 75 percent glass fibers to 25 percent resin by weight. This stamp element acts wet and is easily placed in the mold. Conventional building elements contain 20–50 percent glass fibers to 80–50 percent resin, resulting in a much weaker and heavier element.

Also, all resin is used continuously and is continuously freshened. This is essential since resin begins to dry considerably in 15–30 minutes. This eliminates the traditional problem of the batch preparation of resin.

In laying these stamp elements in a mold, satisfactory results have been obtained by laying the stamp element wet-side down in the mold with just a corner placed in proper position. Then, starting from that corner, a roller is rolled against the plastic backing sheet, squeezing out the air as the newly applied stamp is pressed firmly against the stamp element beneath it.

Guide plate 101 feeds each strand 97 into the resin trough 95 independently and separately and this assures that each strand is wet with resin very quickly. Each strand is surrounded by resin in the trough and the resin is squeezed upwardly through the strand by squeeze rollers 89 and 91. This is better than spraying which tends to put air into the element.

The apparatus of FIGS. 9 to 14 provides continuous operation and good control of the amount of resin in the finished product so that the resulting building elements are highly uniform. Lack of uniformity has been a problem in conventional building elements due to entrapment of air and due to the conventional method of manually rolling resin onto a glass mat placed in a boat mold.

Strands 97 are gathered together from bobbins 99 by a number of perforated gathering bars 125 and are passed under rollers 127 and over rollers 129 in their path toward guide plate 101.

A method of making stamp element 119 includes the steps of aligning a plurality of strands 97 of glass fiber roving, impregnating strands 97 with a liquid resin in trough 95, covering each side of resin impregnated strands 97 with a plastic sheet 103 to form a sandwich structure, squeezing air from the sandwich structure by running it through the bight between roller 91 and corrugated roller 107, and cutting across said sandwich structure with knife element 115 to form a stamp element 119.

Knife element 115 and slot 117 are adjustable in position in order to cut across the sandwich structure at any desired angle. Accordingly, the stamp element may take the form of a square, a rhombus, a rectangle, a parallelogram, or a trapezoid.

When the sandwich structure is cut into a rhombus, it is particularly well adapted for forming into a composite angle-cut stamp element because the glass fibers of two layers may be set to cross at any desired angle, depending on the angle of the cut, and the two rhombuses will completely overlap with no edges sticking out. For example, a composite angle-cut stamp element may be formed by cutting across the sandwich structure at an angle such that the cut edges define angles of 50° and 130° with the uncut side edges of the sandwich structure. Then a first such stamp element layer is flopped onto a second with the cut edges of the second in complete alignment with the uncut edges of the first. The strands of glass fiber roving of the second stamp element layer cross the strands of the first and define a pair of opposing 50° angles and a pair of 130° angles.

When it is desired to produce a composite stamp element which tapers, the following procedure is followed. By way of example, the sandwich structure may be cut so that the leading cut edge forms an angle of 30° with the side edge. The next cut may be at an angle such that the trailing cut edge of the first stamp element layer is at an angle of 105° to the side edge. Then the trailing edge of the second stamp element layer is cut at the same angle as the leading edge of the first stamp element layer so that the trailing edge of the second layer forms an angle of 150° with the side edge. Then the stamp element layers are flopped together in such a manner that the smaller side edges lie adjacent to each other as do the larger side edges to form a tapered stamp element. The first and second layers do not coincide exactly.

The angle of the cut between the first and second layers determines the crossing angle of the glass fibers. This system provides for forming a composite stamp element wherein the glass fibers may cross at any angle, and the stamp element may have any taper.

It is to be understood that the form of the invention herewith shown and described is to be taken as a presently preferred embodiment. Various changes may be made in the shape, size, and arrangement of parts. For example, equivalent elements may be substituted for these illustrated and described herein, parts may be reversed, and certain features of the invention may be utilized independently of the use of other features, all without departing from the spirit or scope of the invention as defined in the subjoined claims.

We claim:

1. Apparatus for making a stamp element comprising means for impregnating strands of glass fiber with a liquid resin, said means for impregnating the strands with a liquid resin including a resin trough formed by a pair of trough rollers with a pair of end plates positioned in the bight of the rollers, means for covering the resin impregnated strands with a plastic sheet, and means for cutting across the plastic sheet and strands to form a stamp element.

2. The apparatus of claim 1 wherein the means for covering with a plastic sheet includes a pair of supply rollers which feed a plastic sheet to each trough roller and through the bright therebetween so as to enclose the strands and resin between sheets to form a sandwich structure.

3. The apparatus of claim 2 including means for squeezing air from the sandwich structure.

4. The apparatus of claim 3 wherein the air squeezing means includes a corrugated roller forming a bight with one of the trough rollers.

5. The apparatus of claim 1 including means for aligning a plurality of strands of glass fiber roving which are to be fed to the means for impregnating the strands with a liquid resin.

6. The apparatus of claim 5 wherein said aligning means comprises a perforated guide plate which receives the strands and separates and uniformly spaces them apart.

7. Apparatus for making a stamp element comprising means for impregnating strands of glass fiber with a liquid resin, means for covering the resin-impregnated strands with a plastic sheet, and means for cutting across the plastic sheet and strands to form a stamp element, said means for impregnating the strands with a liquid resin including a trough formed by a pair of trough rollers with a pair of end plates positioned in the bight of the rollers, said means for covering with a plastic sheet including a pair of supply rollers which feed a plastic sheet to each trough roller and through the bight therebetween so as to enclose the strands and resin between sheets to form a sandwich structure, said apparatus also including a corrugated roller forming a bight with one of the trough rollers for squeezing air from the sandwich structure, and a perforated guide plate which receives and aligns the strands before they are fed to the resin trough.

8. Apparatus for making a stamp element comprising a rotatable drum having a cylindrical surface, a removable plastic sheet covering said cylindrical surface completely and being mounted on said drum prior to any winding process, means for winding strands on said plastic sheet covering said drum, means for impregnating the strands with a resin before winding the strands on the drum, and a slot formed across the width of said drum beneath said plastic sheet and adapted to receive a cutting tool to cut the sheet and wound strands and form them into a stamp element.

9. The apparatus of claim 8, wherein the stamps comprise a plurality of spools of glass fiber roving, the ends of said roving being connected to the drum.